United States Patent [19]

Shamie

[11] Patent Number: 5,417,449
[45] Date of Patent: May 23, 1995

[54] REDUCED SIZE TANDEM STROLLER WITH DIFFERENT SEAT HEIGHTS

[76] Inventor: Louis Shamie, 972 Dean St., Brooklyn, N.Y. 11238

[21] Appl. No.: 149,672

[22] Filed: Nov. 9, 1993

[51] Int. Cl.⁶ .................................... B62B 7/08
[52] U.S. Cl. .............................. 280/642; 280/658; 280/47.35; 280/47.4; 297/243
[58] Field of Search .............. 280/643, 642, 644, 658, 280/47.38, 47.4, 647, 650; 297/243, 248, 239; D12/128, 129, 130

[56] References Cited

U.S. PATENT DOCUMENTS

| | | | |
|---|---|---|---|
| D. 311,363 | 10/1990 | Lin | D12/129 |
| 2,857,953 | 10/1958 | Berger et al. | 297/243 X |
| 4,542,915 | 9/1985 | Wheeler, III et al. | 280/642 |
| 4,858,947 | 8/1989 | Yee et al. | 280/644 X |
| 5,018,754 | 5/1991 | Cheng | 280/644 X |
| 5,221,106 | 6/1993 | Shamie | 280/644 |

FOREIGN PATENT DOCUMENTS 2615155  11/1988  France .................. 280/642

*Primary Examiner*—Margaret A. Focarino
*Assistant Examiner*—Carla Mattix
*Attorney, Agent, or Firm*—Burgess, Ryan & Wayne

[57] ABSTRACT

A tandem stroller includes two side frames having a pivotal locking assembly for locking the side frames in an open configuration and for permitting the side frames to be folded in a lengthwise direction of the stroller, each side frame including a main side tube and a rear side tube pivotally connected to the main side tube at an intermediate portion thereof; a connecting frame for connecting the side frames together in parallel, spaced relation, the connecting frame including two lengthwise support rods pivotally connected to the main side tube and the rear side tube of each side frame and a first transverse connecting bar for connecting the lengthwise support rods together; a front seat formed at a front portion of the connecting frame, the front seat including a front seat bottom extending between the lengthwise support rods, and a front seat back pivotally connected to the lengthwise support rods; and a rear seat formed at a rear portion of the connecting frame, the rear seat being positioned substantially at a raised elevation higher than the front seat, whereby the rear seat can be positioned close to the front seat without interference therefrom and the length of the stroller can be reduced, the rear seat including a rear seat bottom extending parallel to and spaced above the lengthwise support rods at the elevated height substantially greater than the height of the front seat bottom, and a rear seat back pivotally connected to the rear seat bottom.

18 Claims, 3 Drawing Sheets

REDUCED SIZE TANDEM STROLLER WITH DIFFERENT SEAT HEIGHTS

BACKGROUND OF THE INVENTION

The present invention relates generally to strollers, and more particularly, is directed to a reduced size tandem stroller that can safely hold two infants.

Strollers for transporting two infants have been made in two different configurations, namely a side-by-side configuration and a tandem (one in back of the other) configuration. Tandem strollers fold in half in the lengthwise direction. Because tandem strollers must provide sufficient leg room for the rear seated child, the rear seat must be positioned sufficiently far away from the front seat. This, however, increases the length and thereby the size of the stroller. As a result, tandem strollers require a heavy, complicated assembly, and are therefore not easily foldable and transportable.

OBJECTS AND SUMMARY OF THE INVENTION

Accordingly, it is an object of the present invention to provide a tandem stroller that overcomes the problems with the aforementioned prior art.

It is another object of the present invention to provide a tandem stroller which is more compact than conventional tandem strollers.

It is still another object of the present invention to provide a tandem stroller in which the rear seat is positioned higher than the front seat, and thereby, positioned closer to the front seat, as measured in the lengthwise direction of the stroller.

In accordance with an aspect of the present invention, a tandem stroller includes a pair of side frames having pivotal locking means for locking the side frames in an open configuration and for permitting the side frames to be folded in a lengthwise direction of the stroller; connecting means for connecting the side frames together in parallel, spaced relation; a front seat formed at a front portion of the connecting means; and a rear seat formed at a rear portion of the connecting means, the rear seat being positioned substantially at a raised elevation higher than the front seat, wherein the rear seat can be positioned close to the front seat without interference therefrom and the length of the stroller can be reduced.

Specifically, each side frame includes a main side tube and a rear sidle tube pivotally connected to the main side tube at an intermediate portion thereof.

The connecting means includes two lengthwise support rods pivotally connected to the main side tube and the rear side tube of each side frame and first transverse connecting bar means for connecting the lengthwise support rods together. The connecting means further includes second transverse connecting bar means for fixedly connecting the rear side tubes together and third transverse connecting bar means for fixedly connecting the main side tubes together.

The front seat includes a front seat bottom extending between the lengthwise support rods, and a front seat back pivotally connected to the lengthwise support rods.

The rear seat includes a rear seat bottom extending parallel to and spaced above the lengthwise support rods at the elevated height substantially greater than the height of the front seat bottom, and a rear seat back pivotally connected to the rear seat bottom.

The rear seat bottom includes two spaced apart rear seat bottom side bars, each pivotally hinged at a rear end thereof to a respective rear side tube, and extending forwardly therefrom with an orientation which remains substantially parallel to and spaced above the lengthwise support rods, regardless of the configuration of the stroller, and a connecting bar pivotally connected between each rear seat bottom side bar and the respective lengthwise support rod.

The rear seat back includes two back support rods, each pivotally connected at a lower end thereof to a respective rear seat bottom side bar, and a fabric stretched between the back support rods.

Preferably, each of the front and rear seat backs includes means for setting the front and rear seat backs at a desired angle in an open configuration of the stroller.

The above and other objects, features and advantages of the invention will become readily apparent from the following detailed description thereof which is to be read in connection with the accompanying drawings.

DETAILED DESCRIPTION OF THE PREFERRED EMBODIMENTS

Figure 1:
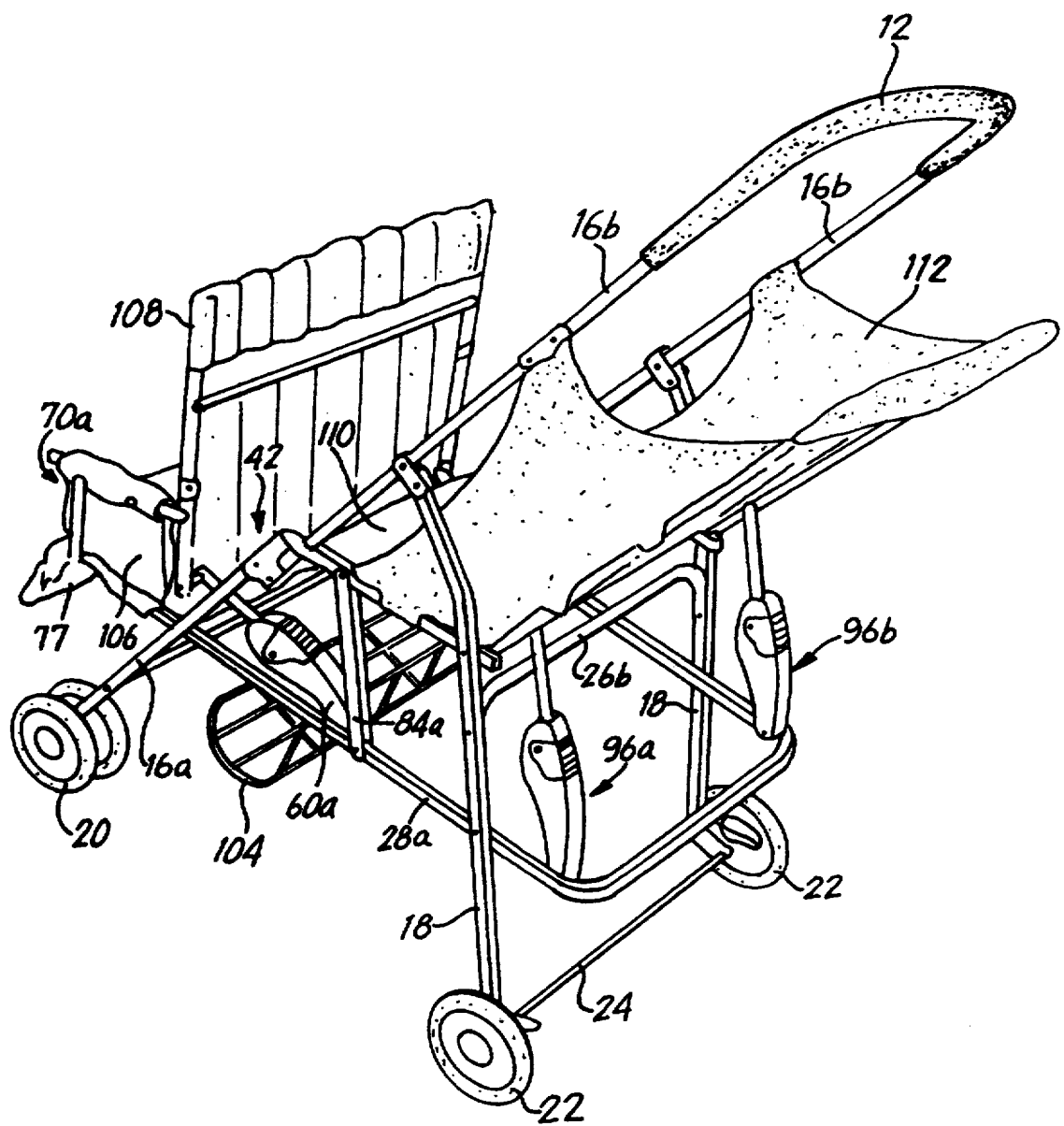
FIG. 1 is a perspective view of a tandem stroller according to the present invention, in its fully opened configuration.

Referring to the drawings in detail, a tandem stroller 10 according to the present invention includes a pair of spaced apart side frame halves 14a and 14b, each having a main side tube 16 and a rear side tube 18 pivotally connected to the respective main side tube 16 at an intermediate portion thereof. Each main side tube 16 includes a lower tube portion 16a that is pivotally mounted at its upper end to an upper tube portion 16b. A U-shaped handle 12 is fixed to the upper free ends of upper tube portions 16b, and the upper ends of rear side tubes 18 are pivotally connected to upper tube portions 16b.

The free lower ends of lower tube portions 16a carry the front wheels 20 of stroller 10, while the free lower ends of rear side tubes 18 carry the rear wheels 22 of stroller 10. Specifically, an axle 24 passes through the lower ends of rear side tubes 18, and rear wheels 22 are mounted at opposite ends of axle 24. Rear wheels 22 are also provided with foot actuated releasable brakes 23.

To provide greater rigidity of stroller 10 and to interconnect frame halves 14a and 14b in a parallel, spaced apart relation, a cross bar 26a is connected between the lower ends of lower tube portions 16a, at a position above front wheels 20, and a cross bar 26b is connected between mid-positions of rear side tubes 18.

A central frame 27 further interconnects frame halves 14a and 14b. Specifically, central frame 27 includes two lengthwise support rods 28a and 28b that extend in the lengthwise direction of stroller 10 to a position in front of front wheels 20 and to a position to the rear of rear wheels 22. Support rods 28a and 28b are pivotally connected by pivot pins 32 at their rear ends to rear side tubes 18 of frame halves 14a and 14b, respectively. In addition, each support rod 28a and 28b is pivotally secured to the respective lower tube portion 16a by pivot pins 34. As a result, support rods 28a and 28b are pivotally connected to the lower ends of rear side tubes 18 and to the respective lower tube portions 16a. A rear cross bar 30 connects the rear ends of support rods 28a and 28b, and preferably, is integrally formed therewith. Any number of additional cross bars 36 can be provided between support rods 28a and 28b.

In addition, front straps 38 and 40 are tightly secured between the front ends of support rods 28a and 28b, and as will be understood from the description hereinafter, forms the base for the front seat.

Before describing the front and rear seats in detail, it is noted that each upper tube portion 16b is connected at its lower end to the upper end of the respective lower tube portion 16a by means of a pivoting securement member 42. Specifically, as is well known, pivoting securement member 42 includes a main housing 44 fixedly held on the upper end of each lower tube portion 16a. Main housing 44 includes an upper opening (not shown). The lower end of each upper tube portion 16b is pivotally secured to a respective main housing 44.

Pivoting securement member 42 also includes a slidable member 46 slidably mounted on the lower end of each upper tube portion 16b. Slidable member 46 is spring biased by an internal spring (not shown) toward main housing 44, and includes a lower button (not shown) which engages within the upper opening of main housing 44. An external tab 48 is provided to the outside of slidable member 46,, whereby a user can move slidable members 46 upwardly along upper tube portions 16b and away from main housing 44, and thereby disengage the lower buttons of slidable members 46 from the upper openings of main housings 44.

Figure 2:
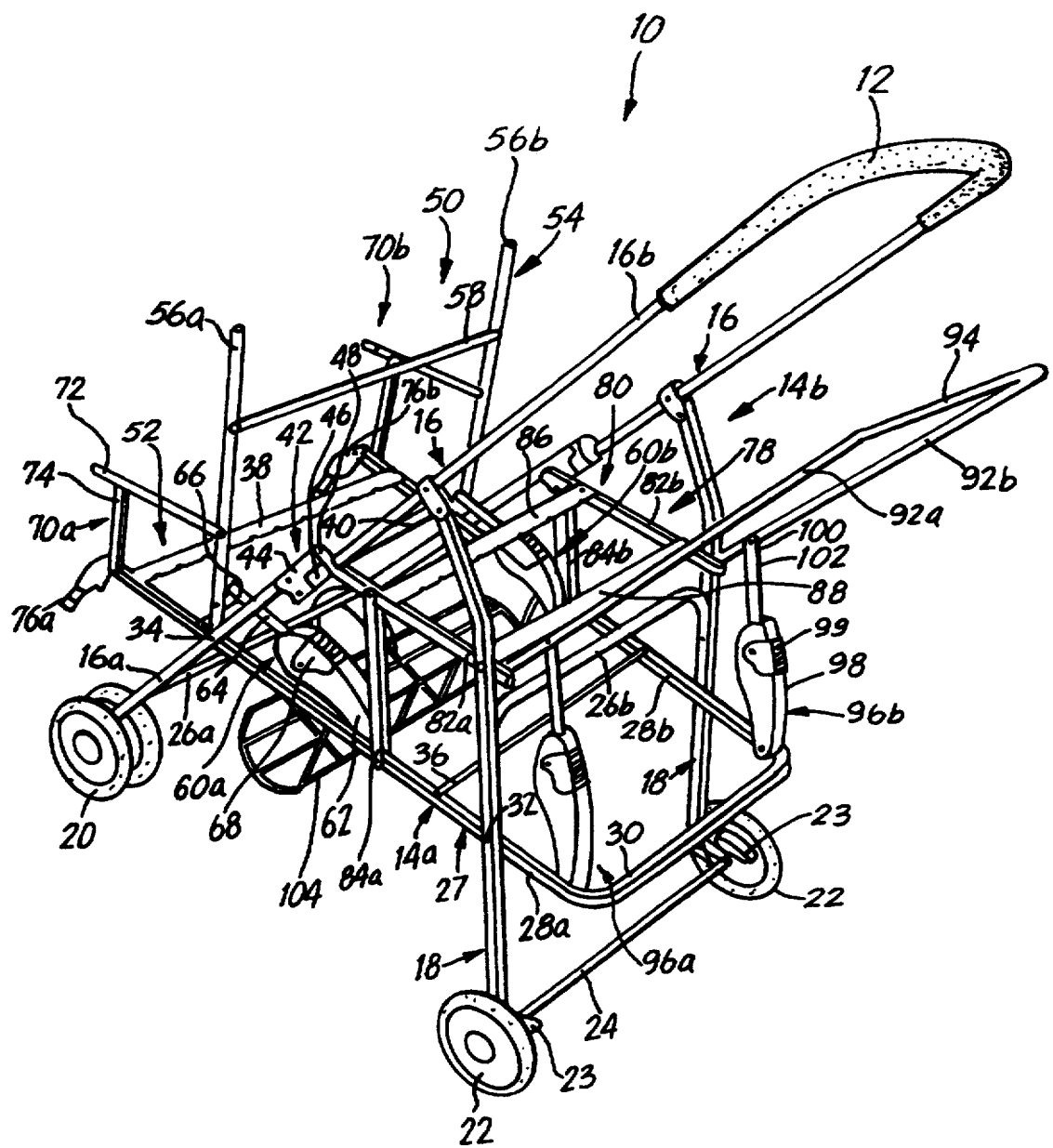
FIG. 2 is a perspective view of the frame of the tandem stroller of FIG. 1.
Figure 3:
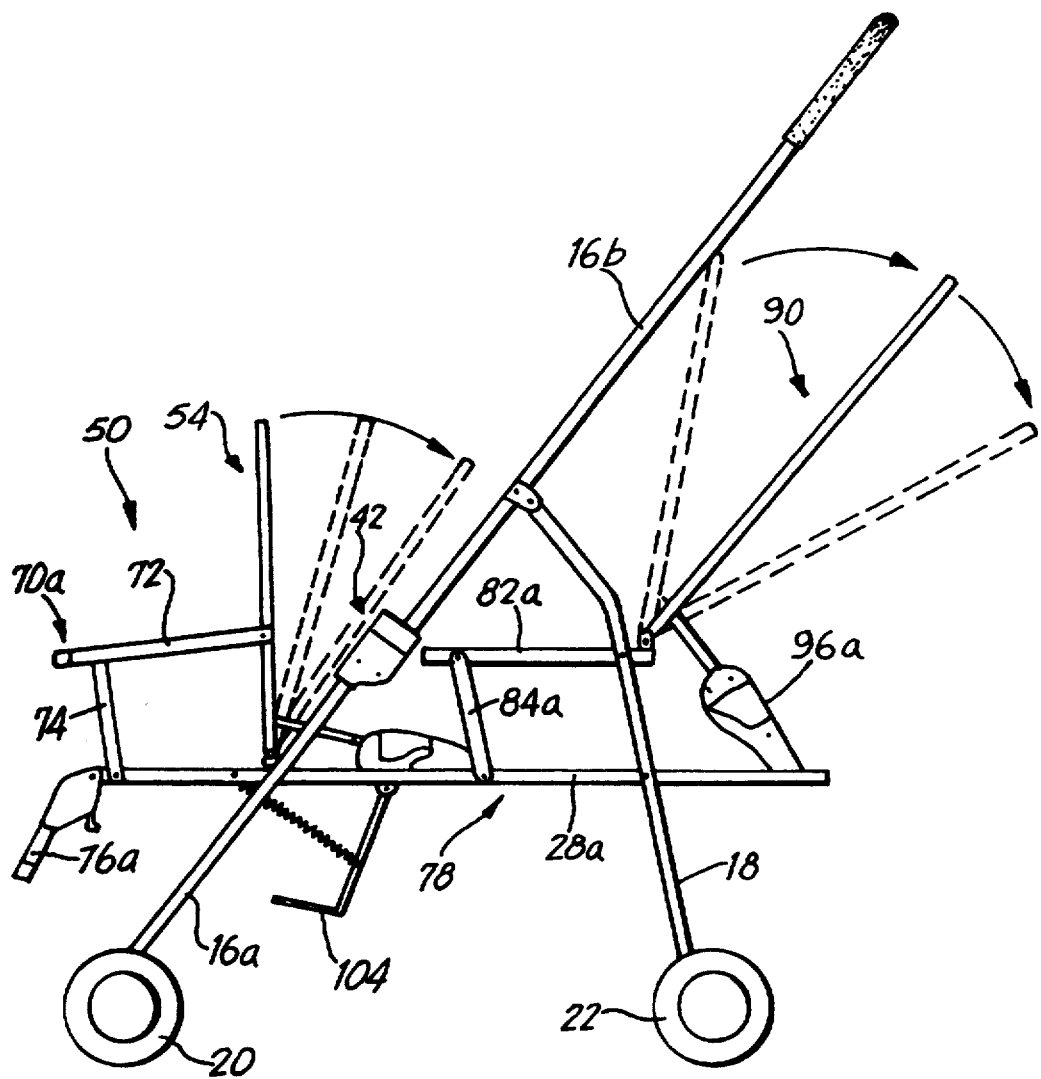
FIG. 3 is a side elevational view of the frame of FIG. 2.

When the lower buttons of the slidable members 46 are engaged with the upper openings of the main housings 44, lower tube portions 16a and upper tube portions 16b are locked in alignment with each other so as to retain stroller 10 in the open configuration of FIGS. 1-3. However, when the lower buttons of the slidable members 46 are moved upwardly along upper tube portions 16b so as to be out of engagement with the upper openings of the main housings 44, upper tube portions 16b can be pivoted relative to lower tube portions 16a so that upper tube portions 16b and lower tube portions 16a are adjacent each other in the closed or folded configuration of stroller 10.

Stroller 10 further includes a front seat 50 having a seat bottom 52 formed by the aforementioned front straps 38 and 40. Front seat 50 further includes a seat back 54 formed by two back support rods 56a and 56b pivotally connected at their lower ends to lengthwise support rods 28a and 28b, respectively. In the open configuration of stroller 10, back support rods 56a and 56b extend in a substantially upright position. A back cross bar 58 interconnects upper ends of back support rods 56a and 56b.

In order to control the amount of inclination of seat back 54, front seat back adjustment mechanisms 60a and 60b are connected between lower portions of back support rods 56a and 56b, respectively, and lengthwise support rods 28a and 28b. Specifically, each front seat back adjustment mechanism 60a and 60b includes a ratchet assembly 62 pivotally connected at one end to lengthwise support rod 28a and 28b, respectively. A ratchet bar 64 is pivotally connected at one end to the lower end of back support rod 56a or 56b, respectively. The opposite end of each ratchet bar 64 is slidably connected through an opening of the respective ratchet assembly 62 and is preventing from escaping therefrom. The end of ratchet bar 64 that extends into ratchet assembly 62 has serrated teeth 66 along one edge thereof. Ratchet assembly 62 has a spring biased pawl (not shown) therein which is biased into engagement with one of the teeth 66 along the respective ratchet bar 64 to hold ratchet assembly 62 and ratchet bar 64 in a predetermined position, and thereby to hold seat back 54 at a desired inclination. To change the inclination of seat back 54, a button 68 of each ratchet assembly 62 is depressed, which removes the pawl from the engaged tooth 66, whereby ratchet bars 64 can slide relative to ratchet assemblies 62. When the desired inclination is attained, buttons 68 are released so that the pawls engage respective teeth 66 to hold seat back 54 in the desired inclination.

In addition, front seat 50 includes arm rests 70a and 70b. Each arm rest 70a and 70b includes an arm rest bar 72 pivotally connected at one end to mid-points of back support rods 56a and 56b, respectively, and extending forwardly therefrom. An arm rest support bar 74 is pivotally connected at one end to the free ends of the respective arm rest bar 72 and is pivotally connected at the opposite end to the respective inclined support rod 28a or 28b.

In addition, foot rest supports 76a and 76b are pivotally connected to the front ends of inclined support rods 28a and 28b, and can be pivoted to different positions. As shown in FIG. 1, a foot rest 77 is connected between foot rest supports 76a and 76b.

In accordance with the present invention, a rear seat 78 is provided at a substantially raised elevation in comparison with front seat 50. As a result thereof, rear seat 78 can be moved forwardly to a greater extent than conventional rear seats of tandem strollers. In this regard, the length of the tandem stroller 10 is greatly reduced over conventional tandem strollers, and thereby, the weight and complexity of the stroller are also reduced.

Specifically, rear seat 78 includes a seat bottom 80 formed by bottom side bars 82a and 82b, each having one end pivotally connected to a respective rear side tube 18 at a position spaced above inclined support rods 28a and 28b. Bottom support bars 84a and 84b are pivotally connected at one end to inclined support rods 28a and 28b and are pivotally connected at the opposite end to the opposite free ends of bottom side bars 82a and 82b, respectively. With this arrangement, bottom side bars 82a and 82b are always parallel to inclined support rods 28a and 28b, that is, in the open configuration, the closed configuration and all intermediate positions, although the spacing between bottom side bars 82a and 82b and support rods 28a and 28b becomes smaller when moving from the open configuration to the closed configuration.

Rear straps 86 and 88 are tightly secured between bottom side bars 82a and 82b so as to form the base for the rear seat.

Rear seat 78 further includes a seat back 90 formed by two back support rods 92a and 92b pivotally connected at their lower ends to the rear ends of bottom side bars 82a and 82b. In the open configuration of stroller 10, back support rods 92a and 92b extend in a substantially upright position. A back cross bar 94 interconnects upper ends of back support rods 92a and 92b. Alternatively,. although not shown, a scissor frame can be provided in place of back cross bar 94.

In order to control the amount of inclination of seat back 90, rear seat back adjustment mechanisms 96a and 96b are connected between lower portions of back support rods 92a and 92b, respectively, and inclined support rods 28a and 28b. Rear seat back adjustment mechanisms 96a and 96b are constructed in an identical manner to front seat back adjustment mechanisms 60a and 60b, and thereby each include a ratchet assembly 98 having a release button 99 and a ratchet bar 100 having serrated teeth 102.

In addition, a rear seat foot rest 104 hangs down from inclined support rods 28a and 28b.

A fabric support structure is also provided, as shown in FIG. 1, and includes a front seat bottom fabric cover 106, a front seat back fabric cover 108, a rear seat bottom fabric cover 110 and a rear seat back fabric cover 112.

Having described a specific preferred embodiment of the invention with reference to the accompanying drawings, it will be appreciated that the present invention is not limited to that precise embodiment and that various changes and modifications can be effected therein by one of ordinary skill in the art without departing from the scope or spirit of the invention as defined by the appended claims.

What is claimed is:

1. A tandem stroller comprising:
    a pair of side frames having pivotal locking means for locking said side frames in an open configuration and for permitting said side frames to be folded in a lengthwise direction of said stroller;
    connecting means for connecting said side frames together in parallel, spaced relation;
    a front seat formed at a front portion of said connecting means, said front seat including:
        a front seat bottom extending between said pair of side frames, and
        a front seat back pivotally connected to said pair of side frames for inclination thereof without inclination of said front seat bottom; and
    a rear seat formed at a rear portion of said connecting means, said rear seat being positioned substantially at a raised elevation higher than said front seat, wherein said rear seat can be positioned close to said front seat without interference therefrom and the length of said stroller can be reduced, said rear seat including:
        a rear seat bottom extending between said pair of side frames at a raised elevation higher than the height of said front seat bottom, said rear seat bottom having a rear portion pivotally connected to said pair of side frames,
        support bar means for supporting said rear seat bottom at said raised elevation, and
        a rear seat back pivotally connected to one of said rear seat bottom and said side frames for inclination thereof without inclination of said rear seat bottom.

2. A tandem stroller according to claim 1, wherein each said side frame includes:
    a main side tube,
    a rear side tube pivotally connected to the main side tube at an intermediate portion thereof, and
    a lengthwise support rod pivotally connected to the main side tube and the rear side tube of each respective said side frame.

3. A tandem stroller according to claim 2, wherein said connecting means includes first transverse connecting bar means for connecting said lengthwise support rods together.

4. A tandem stroller according to claim 3, wherein said connecting means further includes second transverse connecting bar means for fixedly connecting said rear side tubes together and third transverse connecting bar means for fixedly connecting said main side tubes together.

5. A tandem stroller comprising:
    a pair of side frames having pivotal locking means for locking said side frames in an open configuration and for permitting said side frames to be folded in a lengthwise direction of said stroller, each said side frame including:
        a main side tube,
        a rear side tube pivotally connected to the main side tube at an intermediate portion thereof, and
        a lengthwise support rod pivotally connected to the main side tube and the rear side tube of each respective said side frame;
    connecting means for connecting said side frames together in parallel, spaced relation;
    a front seat formed at a front portion of said connecting means, said front seat including:
        a front seat bottom extending between said lengthwise support rods of said pair of side frames, and
        a front seat back pivotally connected to said lengthwise support rods of said pair of side frames for inclination thereof without inclination of said front seat bottom; and
    a rear seat formed at a rear portion of said connecting means, said rear seat being positioned substantially at a raised elevation higher than said front seat, wherein said rear seat can be positioned close to said front seat without interference therefrom and the length of said stroller can be reduced, said rear seat including:
        a rear seat bottom extending between said pair of side frames at a raised elevation higher than the height of said front seat bottom,
        support bar means for supporting said rear seat bottom at said raised elevation, and
        a rear seat back pivotally connected to one of said rear seat bottom and said side frames for inclination thereof without inclination of said rear seat bottom.

6. A tandem stroller according to claim 5, wherein said rear seat bottom extends parallel to and spaced above said lengthwise support rods at said elevated height substantially greater than the height of said front seat bottom, and said rear seat back is pivotally connected to said rear seat bottom.

7. A tandem stroller according to claim 6, wherein said rear seat bottom includes:
    two spaced apart rear seat bottom side bars, each pivotally hinged at a rear end thereof to a respective said rear side tube, and extending forwardly therefrom with an orientation which remains substantially parallel to and spaced above said lengthwise support rods, regardless of the configuration of the stroller, and
    a connecting bar pivotally connected between each said rear seat bottom side bar and the respective lengthwise support rod.

8. A tandem stroller according to claim 7, wherein said rear seat back includes two back support rods, each pivotally connected at a lower end thereof to a respective said rear seat bottom side bar, and a fabric stretched between said back support rods.

9. A tandem stroller according to claim 7, wherein each of said front and rear seat backs includes means for setting said front and rear seat backs at a desired angle in an open configuration of said stroller.

10. A tandem stroller comprising:
a pair of side frames having pivotal locking means for locking said side frames in an open configuration and for permitting said side frames to be folded in a lengthwise direction of said stroller, each said side frame including:
  a main side tube terminating in a handle at an upper end thereof,
  a rear side tube pivotally connected to the main side tube at an intermediate portion thereof, and
  a lengthwise support rod pivotally connected to a lower portion of the main side tube and a lower portion of the rear side tube of each respective said side frame;
a front set of wheels connected to lower ends of said main side tube;
a rear set of wheels connected to lower ends of said rear side tube;
connecting means for connecting said side frames together in parallel, spaced relation;
a front seat extending between front portions of said lengthwise support rods; and
a rear seat connected to rear portions of said lengthwise support rods, said rear seat being positioned substantially at a raised elevation higher than said front seat, wherein said rear seat can be positioned close to said front seat without interference therefrom and the length of said stroller can be reduced, said rear seat including:
  a rear seat bottom extending between said pair of side frames at a raised elevation higher than the height of said front seat bottom, said rear seat bottom having a rear portion pivotally connected to said pair of side frames,
  support bar means for supporting said rear seat bottom at said raised elevation, and
  a rear seat back pivotally connected to one of said rear seat bottom and said side frames for inclination thereof without inclination of said rear seat bottom.

11. A tandem stroller according to claim 10, wherein said connecting means includes first transverse connecting bar means for connecting said lengthwise support rods together.

12. A tandem stroller according to claim 11, wherein said connecting means further includes second transverse connecting bar means for fixedly connecting said rear side tubes together and third transverse connecting bar means for fixedly connecting said main side tubes together.

13. A tandem stroller comprising:
a pair of side frames having pivotal locking means for locking said side frames in an open configuration and for permitting said side frames to be folded in a lengthwise direction of said stroller, each said side frame including:
  a main side tube terminating in a handle at an upper end thereof,
  a rear side tube pivotally connected to the main side tube at an intermediate portion thereof, and
  a lengthwise support rod pivotally connected to a lower portion of the main side tube and a lower portion of the rear side tube of each respective said side frame;
a front set of wheels connected to lower ends of said main side tube;
a rear set of wheels connected to lower ends of said rear side tube;
connecting means for connecting said side frames together in parallel, spaced relation;
a front seat extending between front portions of said lengthwise support rods, said front seat including a front seat bottom extending between said lengthwise support rods, and a front seat back pivotally connected to said lengthwise support rods; and
a rear seat connected to rear portion is of said lengthwise support rods, said rear seat being positioned substantially at a 14. A tandem stroller according to claim 13, wherein said rear seat includes a rear seat bottom extending parallel to and spaced above said lengthwise support rods at said elevated height substantially greater than the height of said front seat bottom, and a rear seat back pivotally connected to said rear seat bottom.

15. A tandem stroller according to claim 14, wherein said rear seat bottom includes:
two spaced apart rear seat bottom side bars, each pivotally hinged at a rear end thereof to a respective said rear side tube, and extending forwardly therefrom with an orientation which remains substantially parallel to and spaced above said lengthwise support rods, regardless of the configuration of the stroller, and
a connecting bar pivotally connected between each said rear seat bottom side bar and the respective lengthwise support rod.

16. A tandem stroller according to claim 15, wherein said rear seat back includes two back support rods, each pivotally connected at a lower end thereof to a respective said rear seat bottom side bar, and a fabric stretched between said back support rods.

17. A tandem stroller according to claim 14, wherein each of said front and rear seat backs includes means for setting said front and rear seat backs at a desired angle in an open configuration of said stroller.

18. A tandem stroller comprising:
a pair of side frames having pivotal locking means for locking said side frames in an open configuration and for permitting said side frames to be folded in a lengthwise direction of said stroller, each said side frame including:
  a main side tube terminating in a handle at an upper end thereof,
  a rear side tube pivotally connected to the main side tube at an intermediate portion thereof, and
  a lengthwise support rod pivotally connected to a lower portion of the main side tube and a lower portion of the rear side tube of the respective said side frame;
connecting means for connecting said side frames together in parallel, spaced relation;
a front seat formed at a front portion of said connecting means, said front seat including:
  a front seat bottom extending between said lengthwise support rods, and
  a front seat back pivotally connected to said lengthwise support rods for inclination thereof without inclination of said front seat bottom; and
a rear seat formed at a rear portion of said connecting means, said rear seat being positioned substantially at a raised elevation higher than said front seat, wherein said rear seat can be positioned close to said front seat without interference therefrom and the length of said stroller can be reduced, said rear seat including:

a rear seat bottom extending parallel to and spaced above said lengthwise support rods at a raised elevation higher than the height of said front seat bottom, support bar means for supporting said rear seat bottom at said raised elevation, and a rear seat back pivotally connected to said rear seat bottom for inclination thereof without inclination of said rear seat bottom.

* * * * *